United States Patent
Cho

[11] Patent Number: 5,764,443
[45] Date of Patent: Jun. 9, 1998

[54] ROTARY TRANSFORMER WITH FLEXIBLE PRINTED CIRCUIT BOARDS

[75] Inventor: Bu-Hyun Cho, Seoul, Rep. of Korea

[73] Assignee: Daewoo Electronics Co., Ltd., Seoul, Rep. of Korea

[21] Appl. No.: 739,250

[22] Filed: Oct. 29, 1996

[30] Foreign Application Priority Data

Oct. 30, 1995 [KR] Rep. of Korea ............ 95 38079

[51] Int. Cl.⁶ .................................................. G11B 5/52
[52] U.S. Cl. ............................................................ 360/108
[58] Field of Search ................................ 360/108, 107, 360/84, 130.24

[56] References Cited

U.S. PATENT DOCUMENTS 4,692,822  9/1987  Ksbscinski ...................... 360/34
4,829,401  5/1989  Vranken ........................... 361/380

FOREIGN PATENT DOCUMENTS 0218142  4/1987  European Pat. Off. .
5998509  6/1984  Japan .
2125205  2/1984  United Kingdom .

Primary Examiner—John H. Wolff
Attorney, Agent, or Firm—Anderson, Kill & Olick, P.C.

[57] ABSTRACT

A rotary transformer comprises a rotor and a stator transformers. The rotor transformer has at least one first annular groove formed on a flat surface thereof and at least one first flexible printed circuit board ("FPCB") each of which is provided with a first annular portion and a first terminal portion on which a first circuit pattern is printed, the first annular portion being inserted into the first groove. The stator transformer has at least one second annular groove formed on a flat surface thereof, the second groove corresponding to the first groove of the rotor transformer, and at least one second FPCB each of which is provided with a second annular portion and a second terminal portion on which a second circuit pattern is printed, the second annular portion being inserted into the second groove.

1 Claim, 6 Drawing Sheets

ROTARY TRANSFORMER WITH FLEXIBLE PRINTED CIRCUIT BOARDS

FIELD OF THE INVENTION

The present invention relates to a rotary transformer; and, more particularly, to a rotary transformer with flexible printed circuit boards ("FPCBs").

DESCRIPTION OF THE PRIOR ART

Generally, a rotary transformer serves to transmit a signal between a rotor and a stator bodies. For instance, it transmits electrical signals between a rotary drum and a stationary drum of a head drum assembly in a video cassette recorder ("VCR").

There is shown in FIG. 1 a conventional rotary transformer 1 comprising a rotor and a stator transformers 2, 3 mounted on a rotary body (not shown) and a stationary body (not shown), respectively. The rotor and the stator transformers 2, 3 are provided with a plurality of first and second annular grooves 4, 5 in which a plurality of first and second coils 6, 7 are wound, respectively, forming a plurality of channels.

There exists a gap h between the rotor and the stator transformers 2, 3. An electrical signal is transmitted between the rotary and the stationary bodies through the gap h by the electrical signal flowing in one of the coils 6 and 7 inducing a corresponding electrical signal in the corresponding coil.

However, in manufacturing of such a conventional rotary transformer, the winding of the coil onto each groove is rather difficult and cumbersome, resulting in the poor productivity thereof.

SUMMARY OF THE INVENTION

It is, therefore, a primary object of the present invention to provide a rotary transformer which can be easily manufactured.

In accordance with one aspect of the present invention, there is provided a rotary transformer comprising: a rotor transformer having at least one first annular groove formed on a flat surface thereof and at least one first flexible printed circuit board ("FPCB") each of which is provided with a first annular portion and a first terminal portion on which a first circuit pattern is printed, the first annular portion being inserted into the first groove; and a stator transformer having at least one second annular groove formed on a flat surface thereof, the second groove corresponding to the first groove of the rotor transformer, and at least one second FPCB each of which is provided with a second annular portion and a second terminal portion on which a second circuit pattern is printed, the second annular portion being inserted into the second groove.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
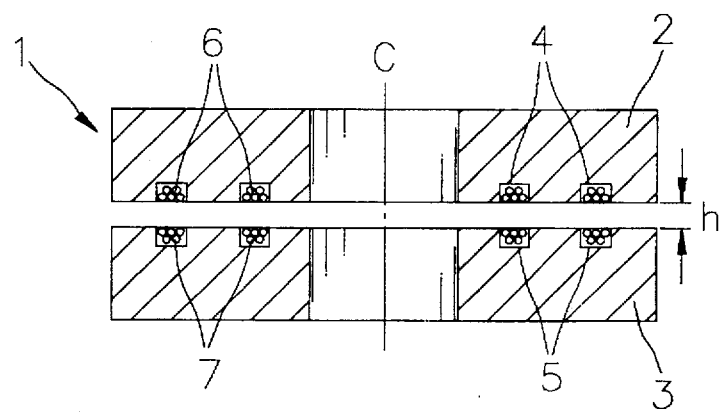
FIG. 1 shows a cross sectional view of a conventional rotary transformer.
Figure 2:
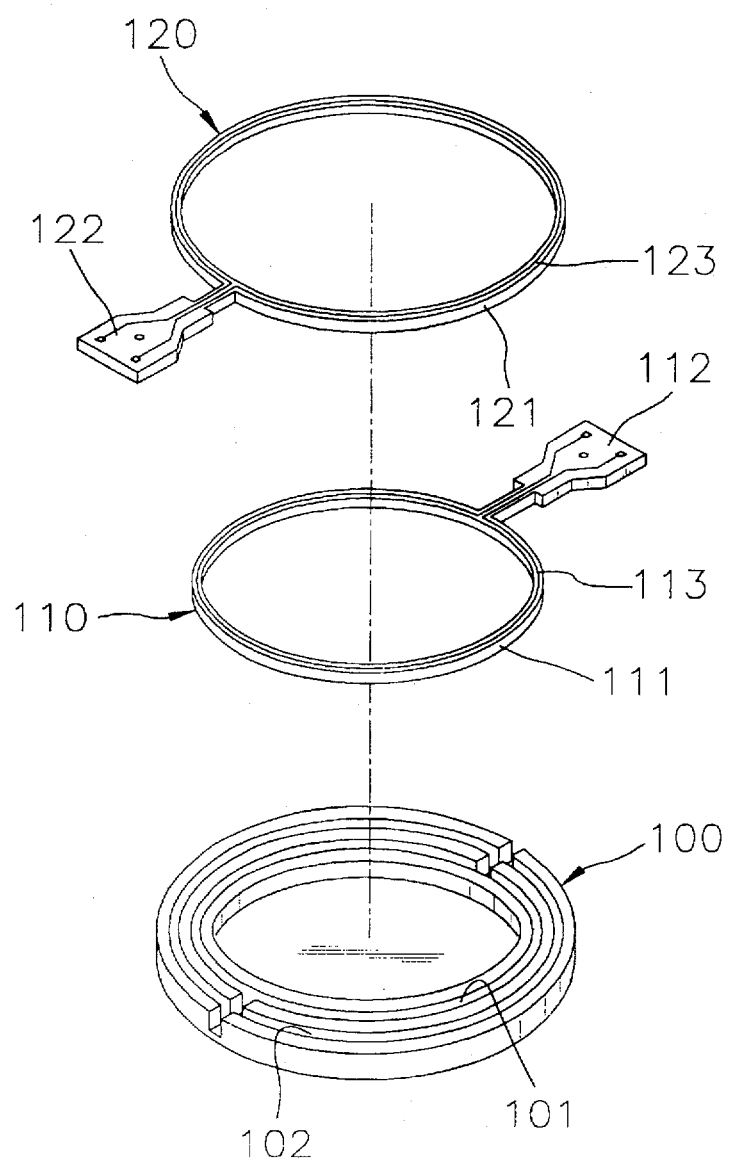
FIG. 2 represents an exploded perspective view of the rotor transformer of the rotary transformer of the present invention.
Figure 3:
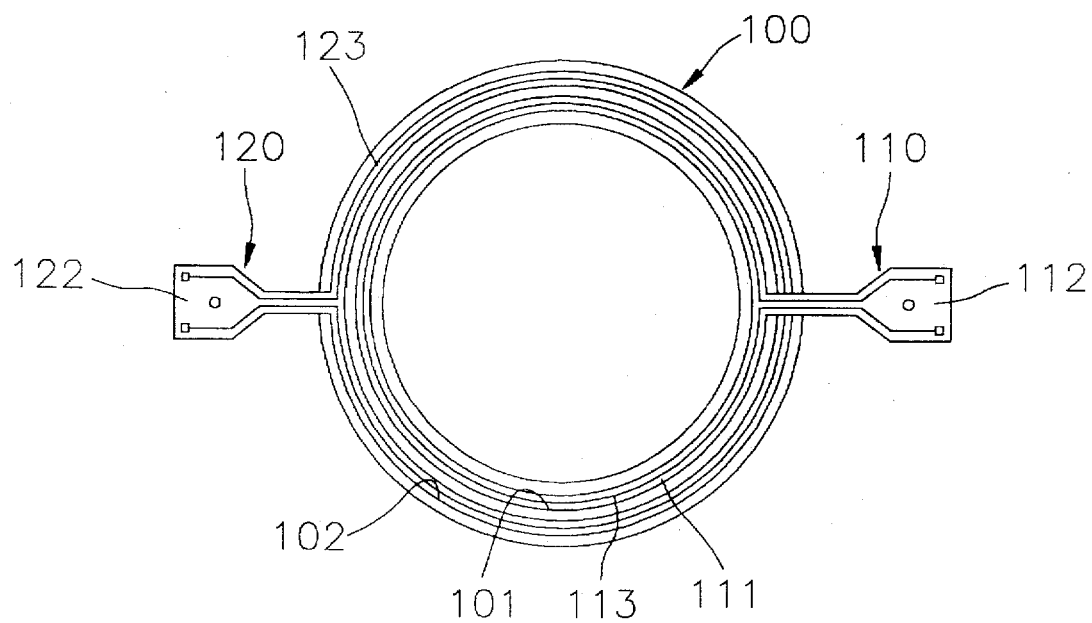
FIG. 3 illustrates a top view of the rotor transformer in FIG. 2.
Figure 4:
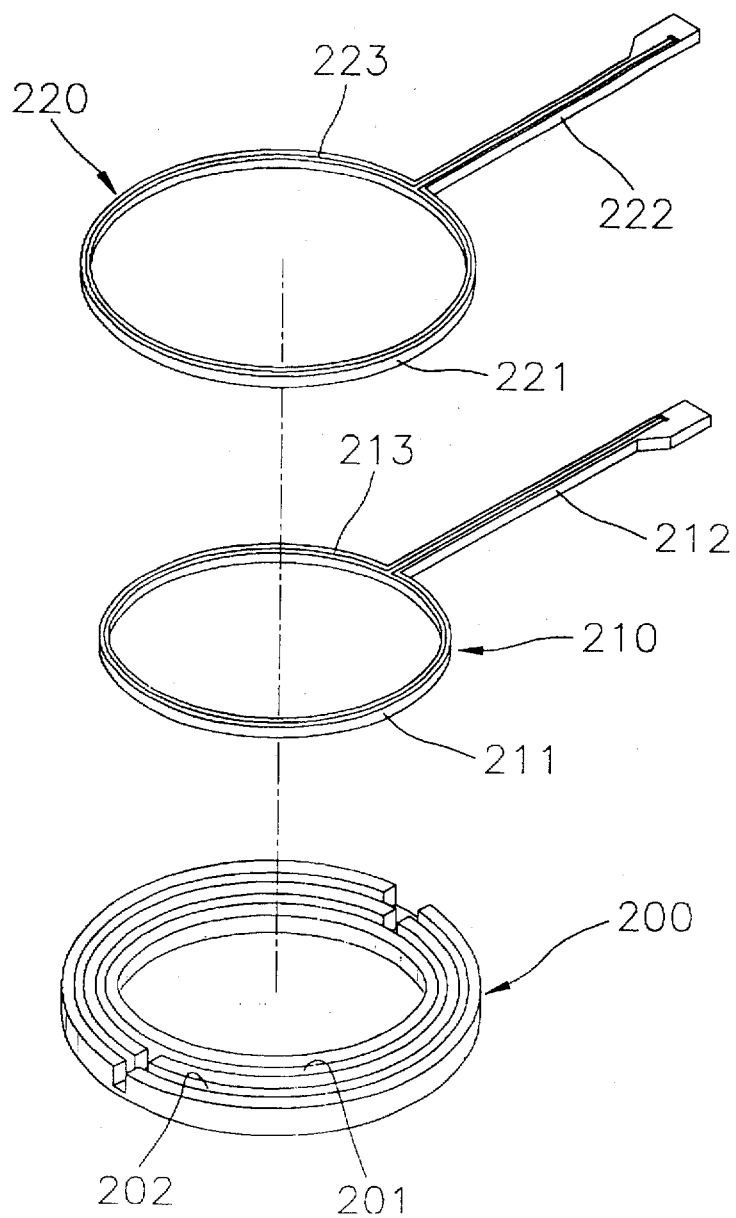
FIG. 4 depicts an exploded perspective view of the stator transformer of the rotary transformer of the present invention.

There are shown in FIGS. 2 to 4 various views of the rotary transformer in accordance with a preferred embodiment of the present invention.

The rotary transformer of the present invention comprises a rotor transformer 100 and a stator transformer 200.

As shown in FIGS. 2 and 3, the rotor transformer 100 has two first annular grooves 101, 102 which are concentrically formed on a flat surface thereof and two first flexible printed circuit boards ("FPCBs") 110, 120, each of which has a first annular portion 111, 121 to be inserted into the corresponding groove 101, 102, a terminal portion 112, 122 and a first circuit pattern 113, 123 printed thereon.

On the other hand, as shown in FIG. 4, the stator transformer 200 has two second annular grooves 201, 202 which are concentrically formed on a flat surface thereof and two second flexible printed circuit boards ("FPCBs") 210, 220, each of which has a second annular portion 211, 221 to be inserted into the corresponding groove 201, 202, a terminal portion 212, 222 and a second circuit pattern 213, 223 printed thereon. The second grooves 201, 202 of the stator transformer 200 correspond to the first grooves 101, 102 of the rotor transformer 100, respectively.

Figure 5A:
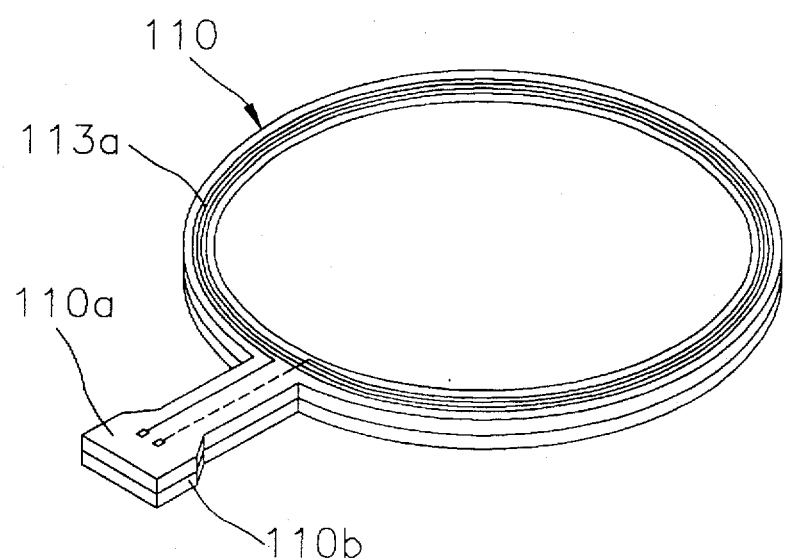
FIGS. 5A and 5B present a perspective view of a FPCB comprise of two layers and a cross sectional view thereof showing the connection between the circuit patterns printed on the upper and the lower layers, respectively.
Figure 5B:
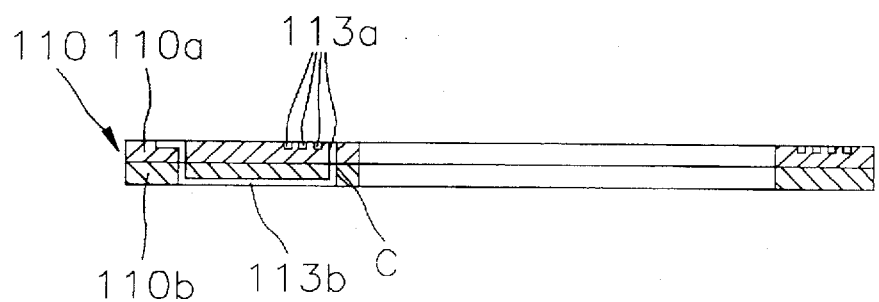

As shown in FIGS. 5A and 5B, the FPCB 110 may be comprised of an upper and a lower layers 110a, 110b superposed and insulated from each other. The upper and the lower layers 110a, 110b are provided with a pair of circuit patterns 113a, 113b, respectively. One circuit pattern 113a formed on the upper layer 110a spirals several times inward along and on the annular portions 111a, end of which being connected to the other circuit pattern 113b formed on the lower layer 110b through a conductor C, thereby increasing the electromotive force induced between the opposite FPCBs 110 and 210. Although there is shown in FIGS. 5A and 5B only the FPCB 110, it is appreciated to those skilled in the art that the other FPCBs 120, 210 and 220 can be formed same as the FPCB 110.

As is well known, the rotor and the stator transformers 100, 200 are fixed to a rotary and a stationary bodies (not shown), respectively, in such a way that the first and second grooves 101, 102 and 201, 202 face each other, respectively, and a gap exists therebetween. An electrical signal is transmitted between the rotary and the stationary bodies through the gap by the electrical signal flowing in one of the circuit patterns inducing a corresponding electrical signal in the corresponding circuit pattern.

Figure 6:
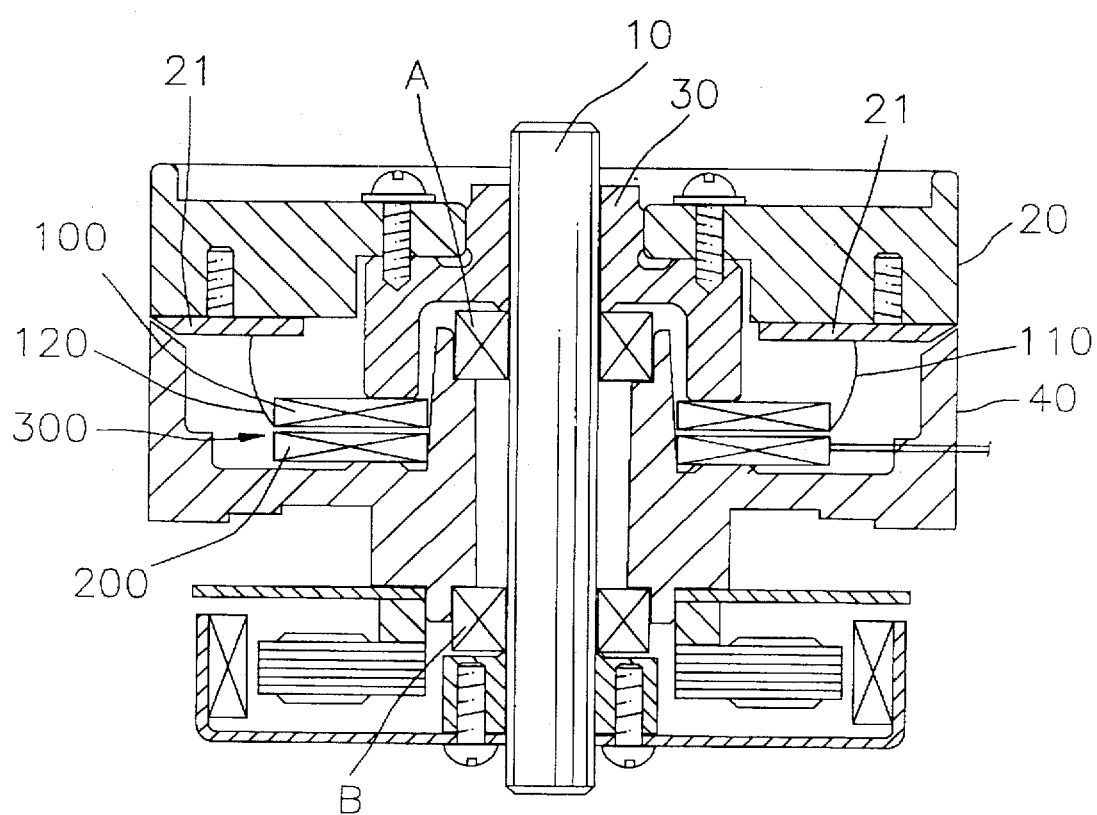
FIG. 6 shows a cross sectional view of a head drum assembly incorporating therein the rotary transformer of the present invention.

For instance, a head drum assembly for use in a VCR incorporating therein the rotary transformer 300 of the present invention, will now be described with reference to FIGS. 5 and 6.

The head drum assembly comprises a rotating shaft 10, an upper drum 20 fixed to the rotating shaft 10, a pair of heads 21 secured to the upper drum 20, a lower drum 40 coupled to the rotating shaft 10 through bearings A and B and the rotary transformer 300.

The rotary transformer 300 has the rotor and the stator transformers 100, 200 which are provided with the first and the second FPCBs 110, 120 and 210, 220, respectively.

The rotor and the stator transformers 100, 200 of the present invention are attached to the upper drum 20 and to the lower drum 40, respectively, in such a way that the first FPCBs 110, 120 of the rotor transformer 100 and the second FPCBs 210, 220 of the stator transformer 200 face each other, maintaining a desired gap therebetween. The terminals of the first FPCBs 110, 120 of the rotor transformer 100 are electrically connected to the heads 21, respectively. Furthermore, the terminals of the second FPCBs 210, 220 of the stator transformer 200 are electrically connected to a signal processing device (not shown).

In such a rotary transformer of the present invention, the mounting of the FPCB into the groove is much simpler than the winding of the coil onto the groove in the prior art, thereby enhancing the productivity thereof.

Although the invention has been shown and described with respect to the preferred embodiment, it will be understood by those skilled in the art that various changes and modifications may be made without departing from the spirit and the scope of the invention as defined in the following claims.

What is claimed is:

1. A head drum assembly, comprising a rotary drum, a head secured to the rotary drum, a stationary drum; and a rotary transformer, which includes:

a rotor transformer having a first annular groove and a first flexible printed circuit board ("FPCB") disposed in the first groove, the first FPCB being electrically connected to the head; and a stator transformer having a second annular groove corresponding to the first groove of the rotor transformer and a second FPCB disposed in the second groove, wherein the rotary and the stationary transformers are fixed to the upper and the lower drums, respectively, in such a way that the first and the second FPCBs face each other, maintaining a gap therebetween, and the first and the second FPCBs are each comprised of an upper and a lower layers which are provided with a perspective circuit pattern formed thereon, the circuit patterns being connected to each other through a conductor.

* * * * *